No. 793,352. PATENTED JUNE 27, 1905.
A. CIOLFI.
WATER CLOSET.
APPLICATION FILED FEB. 6, 1904.

2 SHEETS—SHEET 1.

WITNESSES.
M. H. McMullin
E. B. Gilchrist

INVENTOR
Antonino Ciolfi,
By his Attorneys,
Thurston & Bates

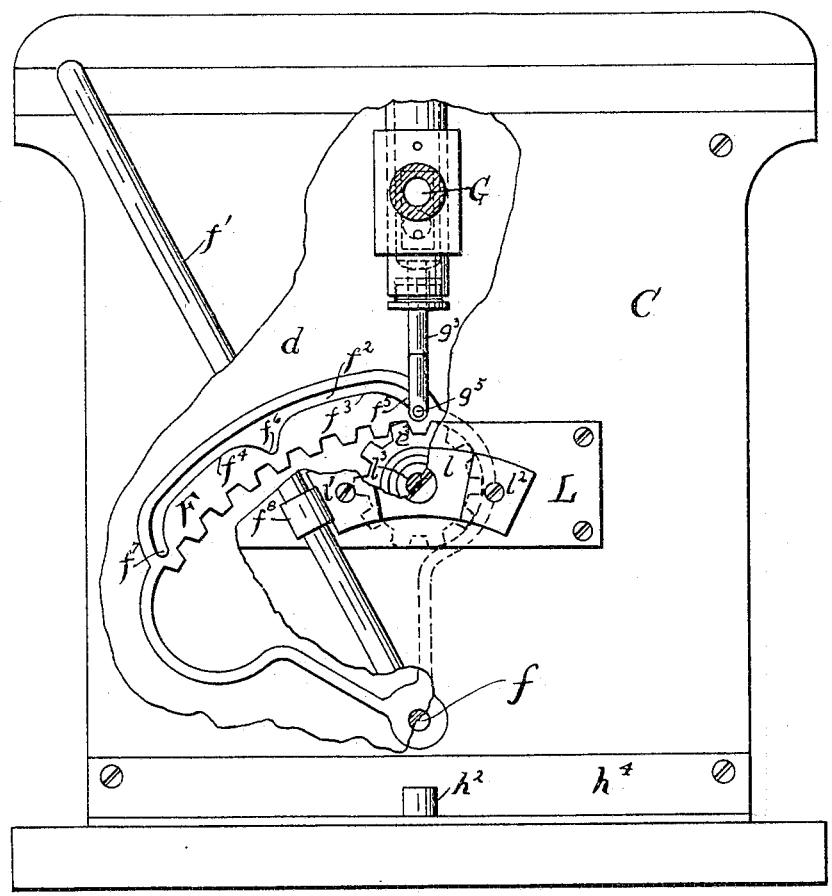

No. 793,352.                                                        Patented June 27, 1905.

UNITED STATES PATENT OFFICE.

ANTONINO CIOLFI, OF CLEVELAND, OHIO, ASSIGNOR TO THE AMERICAN SPECIALTY COMPANY, OF CLEVELAND, OHIO, A CORPORATION.

WATER-CLOSET.

SPECIFICATION forming part of Letters Patent No. 793,352, dated June 27, 1905.

Application filed February 6, 1904. Serial No. 192,274.

*To all whom it may concern:*

Be it known that I, ANTONINO CIOLFI, a subject of the King of Italy, residing at Cleveland, in the county of Cuyahoga and State of Ohio, have invented a certain new and useful Improvement in Water-Closets, of which the following is a full, clear, and exact description, reference being had to the accompanying drawings.

My invention relates to improvements in the construction of water-closets, and has for its object the construction of a closet which shall embody therewith means for continuously isolating the waste-pipe or sewer from the air of the house, which shall provide for effectually dumping and flushing the bowl, and which shall provide for the disinfecting of the air and the contents of the bowl by the employment of electricity or by means of a chemical disinfecting agent.

Generally speaking, the invention may be defined as consisting of the combinations of elements, for the purposes specified, set forth in the claims hereto annexed.

Figure 1:
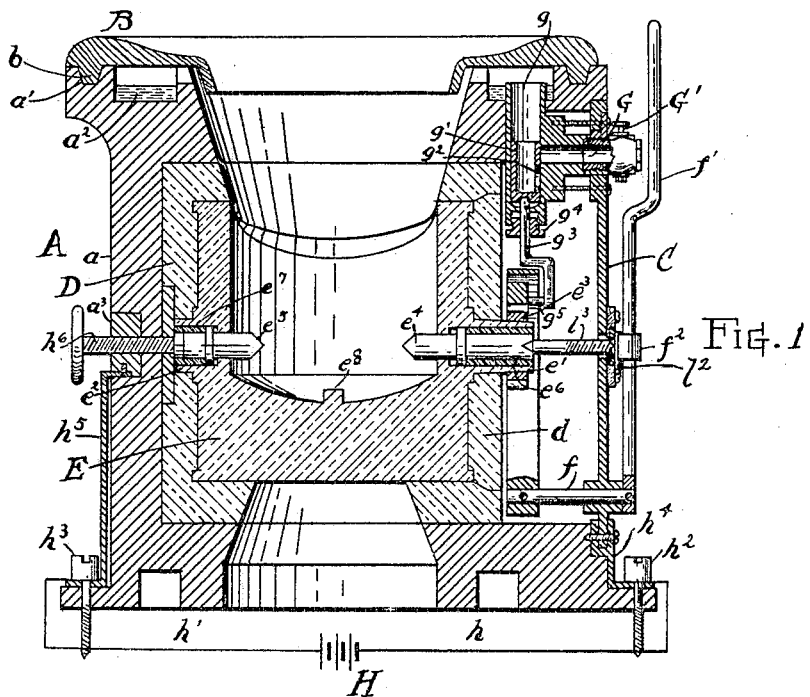
Figure 2:
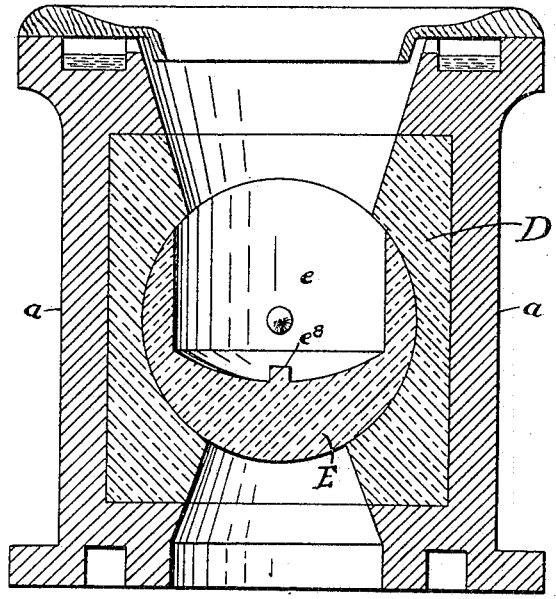

Referring to the drawings, Figure 1 represents a central vertical section through a closet embodying my invention. Fig. 2 represents a similar sectional view, the section being at right angles to Fig. 1. Fig. 3 represents an end elevation, parts being broken away to show the mechanism for dumping, flushing, and electrically disinfecting the bowl.

Describing the parts by letters, A represents the closet, said closet consisting of a metal casing $a$, having at the upper portion a groove $a'$, in which rests a corresponding flange $b$ on the seat B. This metal casing incloses the bowl and accessories, with the exception of the side shown at the right hand of Fig. 1, where the casing is omitted and a removable plate C substituted therefor in order to provide convenient means for obtaining access to the bowl and its operating mechanism.

An annular channel $a^2$ is provided in the upper portion of the casing for the reception and supply of water for flushing the bowl. The inner wall of the casing is frusto-conical in shape, tapering downward and upward toward the bowl. Within the casing $a$ there is fitted, as by cementing, an envelop or casing D, preferably of glass. As shown in the drawings, this envelop is generally of the shape of a rectangular prism and is fitted in a corresponding recess in the metal casing $a$. One side $d$ of this envelop or casing D may be removably fitted to the rest of the casing, whereby access may be had to the bowl proper within said casing. The casing D is provided with oppositely-arranged frusto-conical inner walls forming continuations of the corresponding walls of the outer shell $a$ and tapering toward the bowl E. The lower frusto-conical passage communicates with the ordinary waste-pipe.

Within the casing D is the bowl E. This bowl is of glass, which is polished externally and internally to prevent the formation of small pores or cells within which germ-laden matter may accumulate. The inner surface of the envelop or casing D is similarly polished, and a coating of carbolated vaseline or similar germicidal lubricant may be interposed between the bowl E and such casing D.

As shown in Figs. 1 and 2, the bowl is a valve, preferably cylindrical in shape, having a large internal chamber $e$ therein for the reception of the feces. The lowest portions of the upper periphery of the chamber $e$ are, as shown in Fig. 2, overhung by the inclined wall of the casing D thereabove, said wall forming a continuation of the frusto-conical inner wall of the casing $a$. The bowl is provided with trunnions $e'$ $e^2$, by which it is pivoted in corresponding recesses in the casing D. As will be observed from an inspection of Fig. 2, the distance from either of the opposite lowest portions of the upper periphery of the chamber to the upper periphery of the frusto-conical wall in the lower portion of the casing D is greater than the distance from either of such portions of the periphery of the chamber $e$ to the opposite inclined upper wall of said casing D, thereby insuring that communication between the inlet and outlet of said casing is at all times cut off by the valve or bowl E.

Mounted on the trunnions $e'$ is a pinion $e^3$. This pinion is in mesh with a sector-rack F, which is mounted on an operating-shaft $f$, to which is secured the operating-lever $f'$. In the preferable embodiment of my invention the respective lengths of the radii of said rack and pinion are such that a movement of the lever and rack through an arc of sixty degrees will cause the pinion and associated bowl to make a complete revolution, and the movement of the lever from the position shown in Fig. 3 to a vertical position, through an angle of thirty degrees, will be sufficient to turn the bowl one-half revolution and place it in an inverted position so that it may freely empty the contents into the discharge-pipe and sewer.

In order to automatically flush the bowl by the operation of the dumping-lever $f'$, I employ the following construction: G represents an inlet-pipe for water, said pipe leading to the vertical pipe or duct $g$, communicating with the chamber $a^2$ in the top of the casing. Within the duct $g$ and adapted to slide across the mouth of the pipe G is the cylindrical valve $g'$, said valve being provided with an opening $g^2$, adapted to register with the pipe G. Connected to the bottom of the valve $g'$ is the stem $g^3$ for operating said valve, said stem extending through the packing-nut $g^4$. Rigid with the lower end of the stem $g^3$ is a pin $g^5$, said pin projecting laterally from the stem and engaging a track-cam carried by the sector-rack F. This cam consists of two elevated operating portions $f^3 f^4$ and three depressed or inoperative portions $f^5 f^6 f^7$, located, respectively, at one end, the middle, and the other end of the sector.

With the parts arranged as above described and as illustrated in the drawings it will be seen that when the bowl is in the position shown in Figs. 1 and 2 no water can flow to the chamber $a^2$. When the lever $f'$ is operated to rotate the bowl, the pin $g^5$ rides up on the cam-surface $f^3$, places the opening $g^2$ of the valve $g'$ in register with the pipe G, and allows the water to enter the annular chamber $a^2$ and flush the bowl. A further operation of the lever to a vertical position inverts the bowl and at the same time cuts off the supply of water to flush the same, the pin $g^5$ at this time falling into the depression $f^6$. If desired, the lever may be moved farther in the same direction, whereupon the operations above described will be repeated, except that the bowl will be entirely rotated and will be brought to the position shown in Figs. 1 and 2 by the time that the pin $g^5$ reaches the depression $f^7$.

It will be seen from the above description that the bowl E constitutes, in effect, a valve which at all times cuts off communication between the discharge-pipe and sewer and the atmosphere of the house within which the closet is located. A projection $e^8$ may be formed on the bottom of the bowl for the reception of a sulfur candle, by means of which the bowl and the surrounding air may be disinfected.

In order to disinfect the bowl by means of electricity, I provide the following appliances. Extending through the trunnions of the bowl are the electrodes $e^4 e^5$, which may be of carbon or other suitable material. $e^6 e^7$ designate packing material interposed between said electrodes and trunnions. H designates any convenient source of electricity, from which lead the conductors $h h'$, connected to the binding-screws $h^2 h^3$. The binding-screw $h^2$ is electrically connected with the lever $f'$ by means of the plate $h^4$ and the lower portion of the plate C. Fastened to the plate C in suitable proximity of the trunnion $e'$ is a piece of board or similar non-conducting material L. Secured to this board is the metallic plate $l$, having thereon the contact plates or members $l' l^2$. The center of the plate $l$ is opposite the electrode $e^4$, and a screw $l^3$ connects said plate with said electrode. The lever $f'$ is provided with a slidable sleeve $f^2$, which enables the circuit to be made between said lever and the contact members $l' l^2$. These contact members are so located as to enable the circuit to be made shortly after the institution of the dumping movement of the bowl from whichever side the lever may be operated, also shortly after the institution of the movement to right the bowl after it has been inverted. The screw $h^3$ is electrically connected with the electrode $e^5$ by means of a suitable conductor $h^5$, a metallic plate $a^3$, and a screw $h^6$, extending from said metal plate to the electrode $e^5$. If desired, the valve G' in the pipe G may be closed, and by employing a current of sufficient tension sparks may be passed between the electrodes $e^4 e^5$, ozonizing the air, and thereby disinfecting the bowl and the adjacent atmosphere, or the valve G' may be left open and a current of sufficient strength may be passed through the liquid in the bowl to destroy the germs in a well-known manner. The soluble salts contained in the feces will be sufficient to render the liquid contained in the bowl susceptible of electrolytic decomposition. If desired, the electrolytic apparatus may be placed out of operation at any time by merely sliding the sleeve $f^2$ up or down the lever $f'$, so that it will no longer engage the contacts $l' l^2$.

From the foregoing description, in connection with the drawings, it will be apparent that I have produced a closet that will effectively prevent the access of germ-laden odors from the waste-pipe and sewer to the atmosphere of the apartment in which the closet is situated, which is free from recesses or minute chambers for the breeding of microbes, which will automatically flush the bowl by the operation of the bowl-dumping means, and which will automatically sterilize the contents of the bowl by the operation of said dumping means.

While I have described my invention in detail, it will be apparent that such details may be departed from without departing from the spirit of my invention, and I do not propose to be limited to such details except as they may be included in the claims hereto annexed.

Having described my invention, I claim—

1. In a water-closet, the combination of a casing, a rotary bowl within said casing, means for rotating said bowl to empty the contents of the same, means for electrically sterilizing the contents of said bowl, said sterilizing means being rendered operative by the operation of the bowl-rotating means, substantially as described.

2. In a water-closet, the combination of a casing, a bowl comprising a valve mounted in said casing and having a chamber for the reception of the feces, electrodes carried by said valve and projecting into the chamber of the same for sterilizing the contents thereof, means for operating said valve to discharge the contents thereof into the waste-pipe, and means operated by the valve-operating means to supply electric current to said electrodes, substantially as described.

3. In a water-closet, the combination of a casing having an inlet and an outlet, a rotary bowl in said casing between said inlet and outlet said bowl being provided with trunnions one of which extends through said casing and is provided with a gear, electrodes extending through said trunnions and projecting into the interior of said bowl, a gear for operating the trunnion-gear, means for operating said last-mentioned gear, said operating means forming part of an electric circuit including said electrodes and adapted by its movement to establish the circuit between said electrodes, substantially as described.

4. In a water-closet, the combination of a casing having an inlet and an outlet, a rotary bowl in said casing interposed between said inlet and outlet and constructed to cut off communication therebetween, said bowl being provided with trunnions extending through said casing, electrodes extending through said trunnions and projecting into the interior of the bowl, a pinion on one of said trunnions, a gear meshing with said pinion to rotate the bowl, an operating-lever for said gear, an electric circuit including a contact-plate, means electrically connecting said plate with one of said electrodes, an electric circuit including said operating-lever and contact-plate and the other electrode for sterilizing the contents of the bowl, the arrangement of parts being such that the movement of the lever to rotate the bowl establishes the circuit through said electrodes to sterilize the contents of said bowl, substantially as described.

5. In a water-closet, the combination of a casing, a valve in said casing having a chamber therein and constituting a bowl for the reception of the feces, means for rotating said valve to discharge the contents thereof into the waste-pipe, means for automatically sterilizing the contents of the valve-chamber by the operation of the rotating means, and means also automatically operated by said valve-rotating means for flushing the chamber thereof with water, substantially as described.

6. In a water-closet, the combination of a casing, of a rotary bowl in said casing constructed to at all times shut off communication between the waste-pipe of the closet and the space above said bowl, a trunnion on said bowl extending through said casing, a pinion on said trunnion, a sector-rack meshing with said pinion, said rack being provided with a cam, means for operating said rack, a pipe for supplying water to flush said bowl, a valve adapted by its movement to permit water to flow through said pipe to flush said bowl, an operating-stem for said valve, and a pin carried by said stem and engaging said cam, whereby the operation of the rack to rotate the bowl accomplishes the automatic flushing of said bowl, substantially as described.

7. In a water-closet, the combination of a casing, a rotary bowl fitting in said casing and having an outer surface of polished glass, and means for sterilizing the outer surface of said bowl, substantially as described.

8. In a water-closet, the combination of a casing, a rotary glass bowl fitting in said casing and having its outer surface polished, a germicidal lubricant between said casing and bowl, and additional means for sterilizing the interior of said bowl, substantially as described.

9. In a water-closet, the combination of a casing of glass having the interior surface thereof polished, a rotary glass bowl fitting said casing and having its outer surface polished, and a germicidal lubricant interposed between said bowl and said casing, substantially as described.

10. A water-closet comprising a rotary bowl, the interior of said bowl being of glass or similar material polished to provide a surface free from cavities, combined with means for electrically sterilizing the interior cavity of said bowl, substantially as described.

11. In a water-closet the combination of a rotary bowl having a chamber therein for the reception of the feces, trunnions, electrodes projecting through said trunnions, and means for supplying electric current to said electrodes, substantially as described.

12. In a water-closet, the combination of a bowl the interior surface of which is of polished glass, means for dumping said bowl, means for flushing said bowl, electrodes projecting into the interior of said bowl near the bottom thereof, and means for supplying electric current to said electrodes.

13. In a water-closet, the combination of a rotary bowl constructed to at all times cut off communication between the waste-pipe and the space above said bowl and having an interior surface of polished glass, means for rotating said bowl to dump the same, means for flushing said bowl, electrodes projecting into the interior of said bowl near the bottom thereof and means for supplying electric current to said electrodes.

In testimony whereof I hereunto affix my signature in the presence of two witnesses.

ANTONINO CIOLFI.

Witnesses:
   GEO. MELARAGNO,
   J. B. HULL.